March 22, 1949. G. L. KOVAL 2,464,872
WHEEL ROTATING DEVICE
Filed April 23, 1945
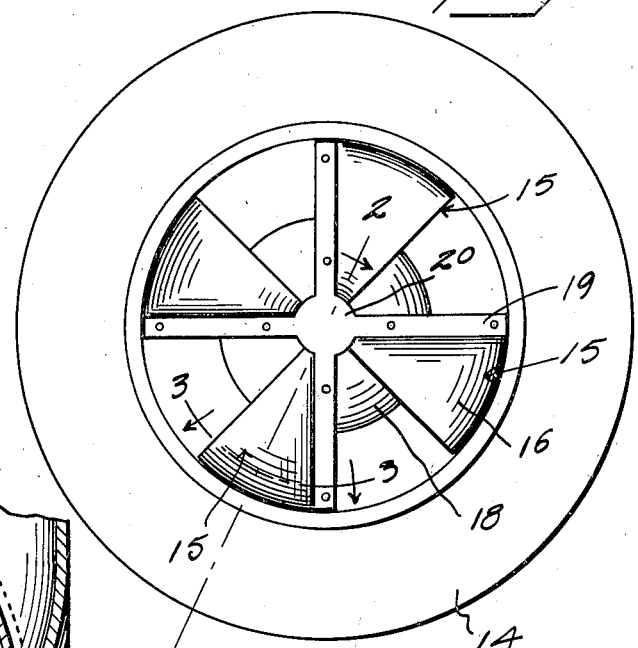
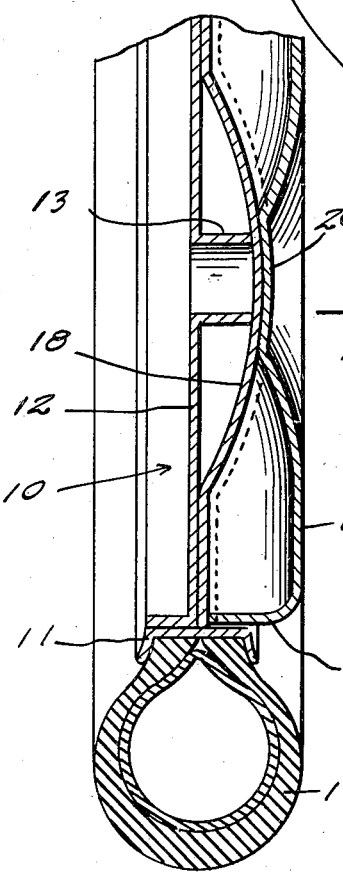
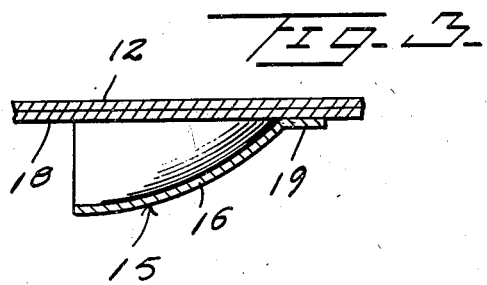
INVENTOR.
G. L. Koval
BY
Kimmel & Crowell attys.

Patented Mar. 22, 1949

2,464,872

UNITED STATES PATENT OFFICE 2,464,872

WHEEL ROTATING DEVICE

George L. Koval, Dover, Del.

Application April 23, 1945, Serial No. 589,711

2 Claims. (Cl. 244—103)

1

This invention relates to tires and wheels for airplanes and more particularly to an improved means to provide for rotation of the wheel prior to contact with the ground.

An object of this invention is to provide an attachment in the form of a wheel rotating means which can be mounted on the present construction of airplane wheels and which, when the wheels are extended, will provide for the initial rotation of the wheels so as to thereby prevent the scraping of wheel on the ground or runway due to the fact that the wheel is initially stationary.

Another object of this invention is to provide a device of this kind which can be mounted on the wheel, inwardly of the tire, so that it will not interfere with the functions of the tire and will not cause undue expense, as is the case with devices of this kind which are formed as part of the tire casing.

With the above and such other objects in view as may hereinafter more fully appear, I have invented the device shown in the accompanying drawings, in which:

Figure 1 is a detail side elevation of a wheel having a rotating means constructed according to an embodiment of this invention mounted thereon.

Figure 2 is a fragmentary sectional view taken on the line 2—2 of Figure 1.

Figure 3 is a fragmentary sectional view taken on the line 3—3 of Figure 1.

Referring to the drawings the numeral 10 designates generally a wheel having a felly 11 secured to a solid spoke structure 12. The spoke structure 12 may be constructed in the form of a disk having a central hub 13. A pneumatic tire 14 is mounted on the felly or rim 11 and is of a conventional construction.

In order to provide a means whereby the wheel may be initially rotated prior to contact with the ground, I have provided a plurality of radially arranged cups, generally designated as 15. The cups 15 include a side wall 16, an outer wall 17, the two walls being secured to a base plate 18. The plate 18 is formed with a dished central portion for engagement over the wheel hub 13, and the cups 15 open in the same direction so as to provide for rotation of the wheel in the proper direction.

The cups 15 have the outer walls 16 thereof inclined inwardly and rearwardly as shown in Figure 3, and these cups at their trailing or rear edges are formed integral with a radial arm 19. The arm 19 is formed integral with a central plate 20 which may be secured in any suitable manner to the base plate 18. The disclosure shows four cups 15 on the outer side of the wheel 10, inwardly

2 from the tire 14, but it will be understood that there may be more or less of these cups as may be desired.

In the use and operation of this device the attachment comprising the plate 18, and the cups 15, may be secured to the disk 12, in any suitable manner. The cups 15 are adapted, when in their lower position, to face the direction of movement of the plane so that when the wind engages in the cups the wind will cause rotation of the wheels in the direction of the movement of the plane.

Inasmuch as this structure is mounted on the wheel proper, the pneumatic tire can be placed on or removed from the wheel in the usual manner without interfering with the rotating attachment.

What I claim is:

1. A rotating attachment for airplane wheels comprising a disc-shaped plate for attachment to the wheel, said plate having an outwardly bowed central portion overlying the hub of the wheel, an outer plate overlying said first plate, a plurality of oppositely disposed V-shaped cups formed on said outer plate, a depressed center portion on said latter plate or the apex of said cups overlying the center of said first plate, radially extending arms on said outer plate forming the trailing edge of said cups and means securing said arms to said first plate.

2. A rotating attachment for airplane wheels comprising an inner disc shaped plate for attachment to a wheel within the rim thereof, said plate formed with an outwardly bowed central portion overlying the hub of the wheel, oppositely disposed V-shaped cups overlying said inner plate, the upper surface of said cups converging radially and circumferentially with said inner plate, a radially extending arm formed on the rear edge of each of said cups, an inwardly offset central plate connecting the inner ends of said arms and said cups and means securing said arms to said inner plate.

GEORGE L. KOVAL.

REFERENCES CITED

The following references are of record in the file of this patent:

UNITED STATES PATENTS

| Number | Name | Date |
|--------|------|------|
| 1,829,500 | Brown | Oct. 27, 1931 |
| 2,143,950 | Kliesrath | Jan. 17, 1939 |
| 2,312,159 | Gulotta | Feb. 23, 1943 |

FOREIGN PATENTS

| Number | Country | Date |
|--------|---------|------|
| 328,746 | Germany | Dec. 1, 1921 |